Dec. 5, 1961   M. BERCHTOLD   3,011,487
ADJUSTABLE STATOR PLATE FOR VARIABLE SPEED
AERO-DYNAMIC WAVE MACHINE
Filed June 17, 1958   7 Sheets-Sheet 1
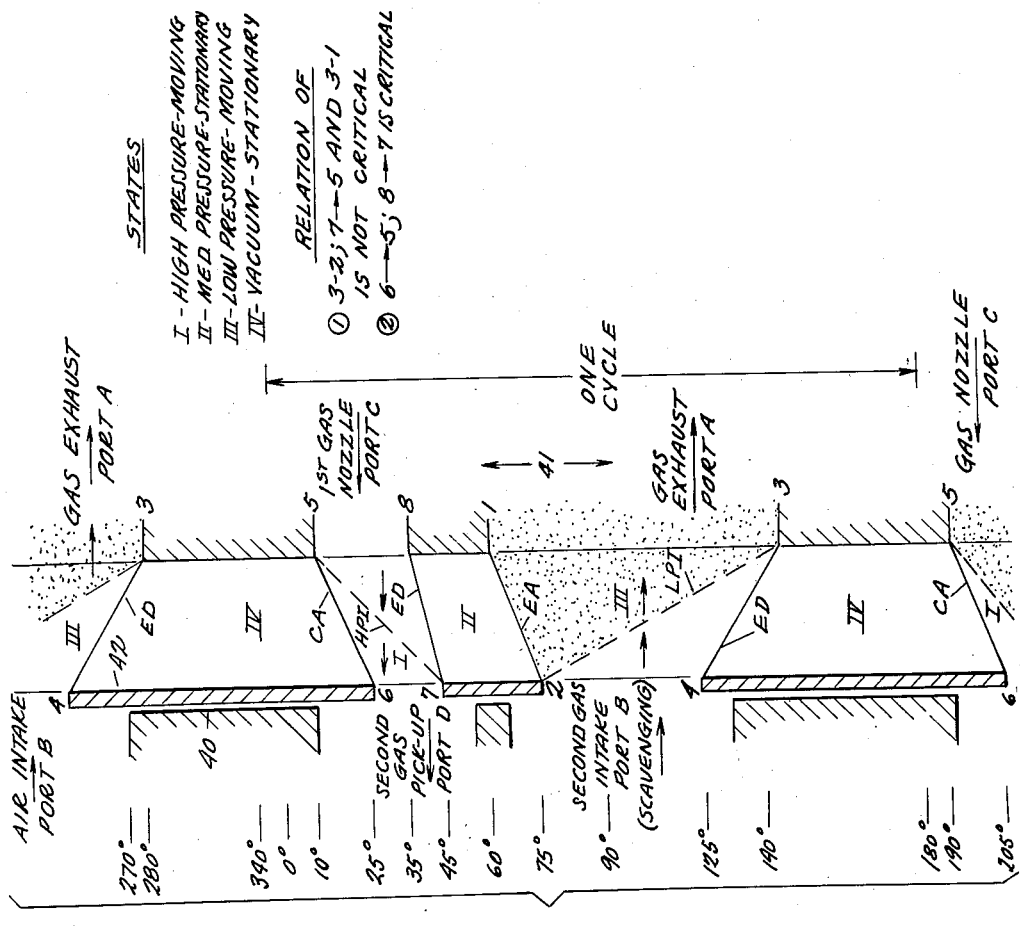
INVENTOR.
MAX BERCHTOLD
BY
ATTORNEYS

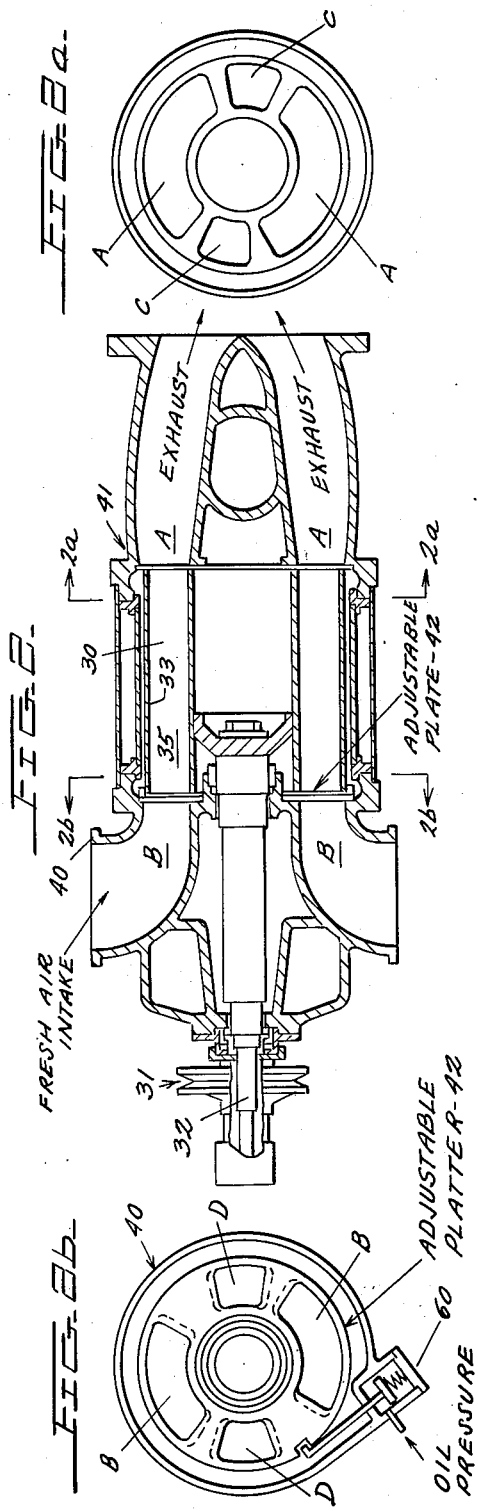

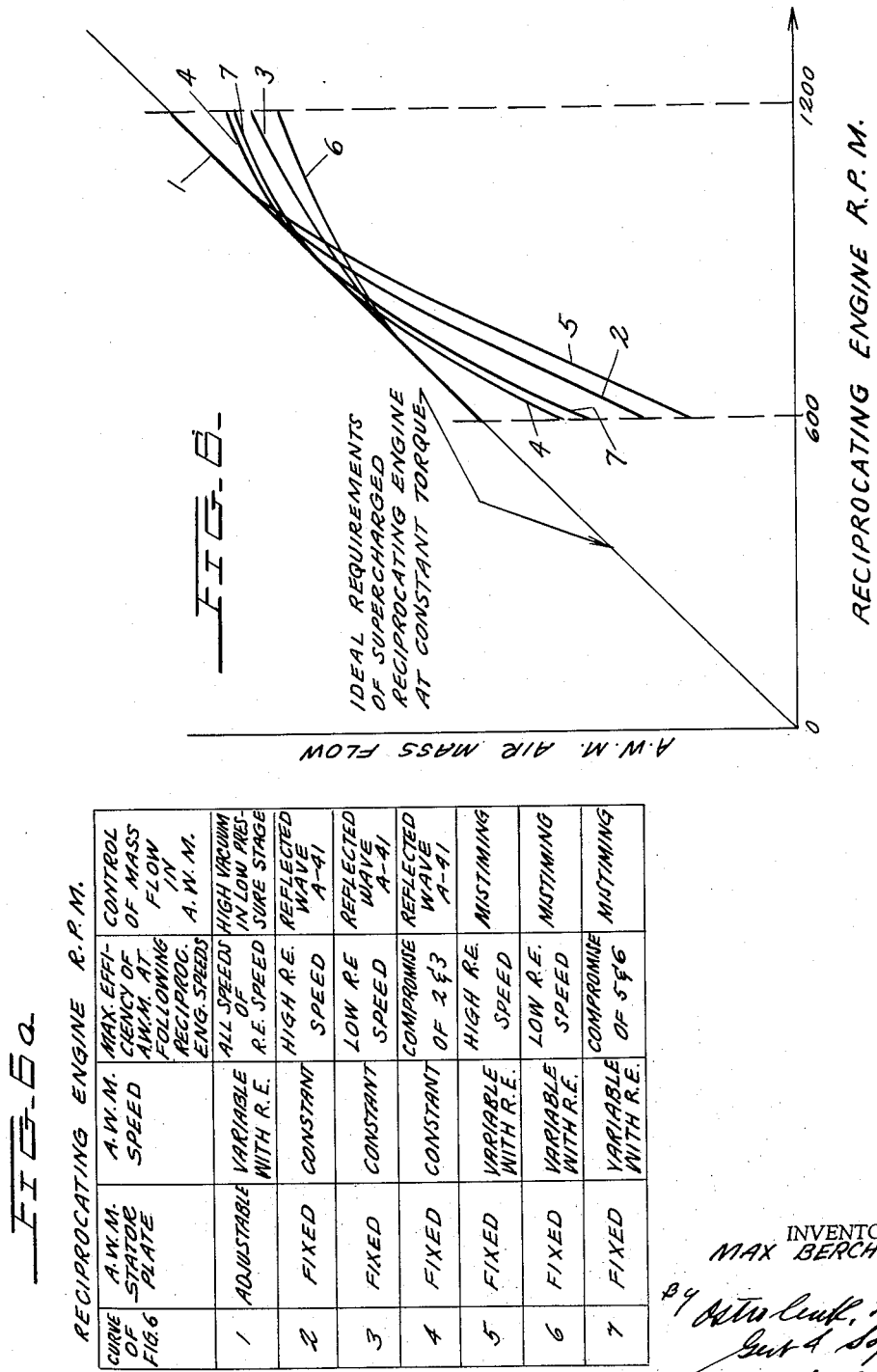

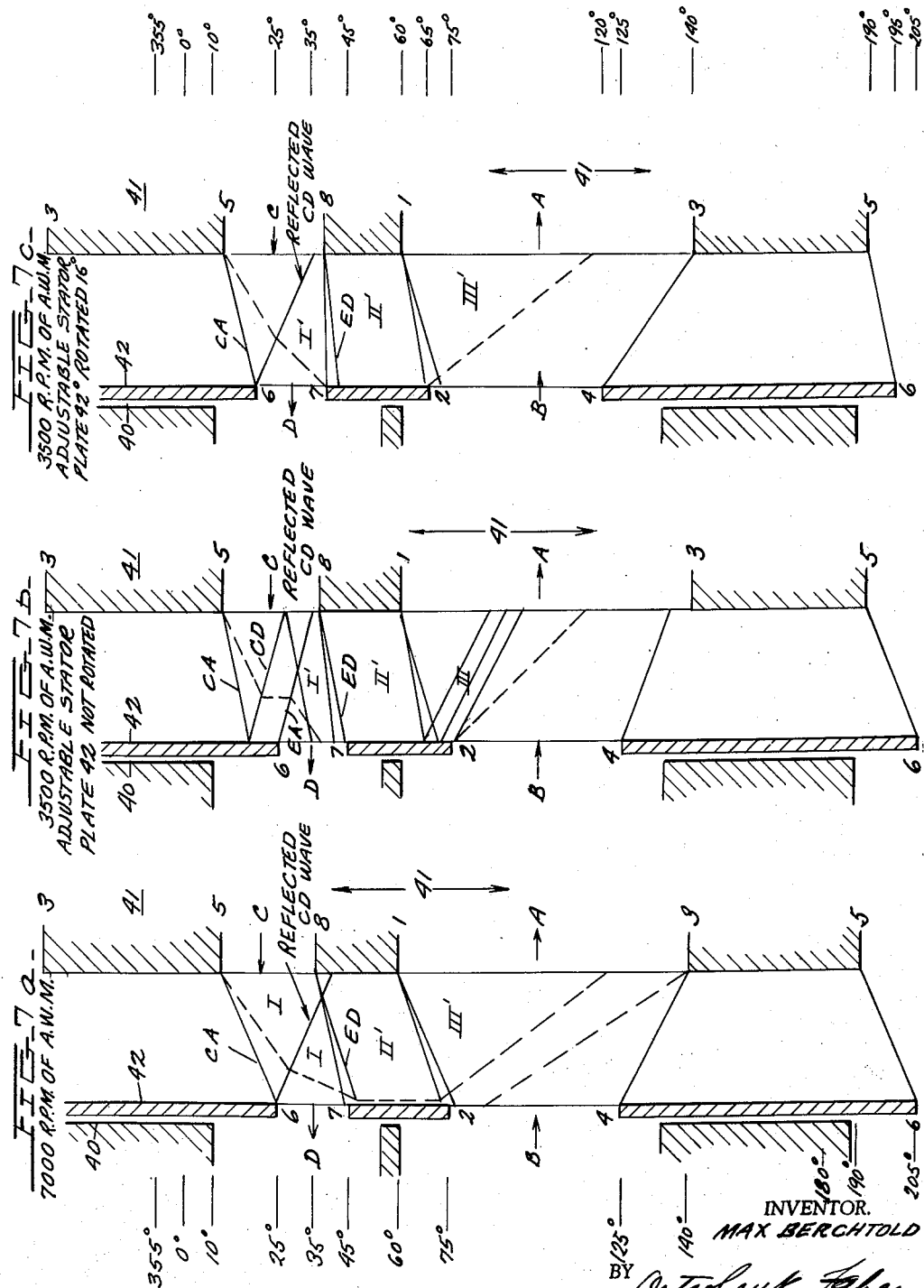

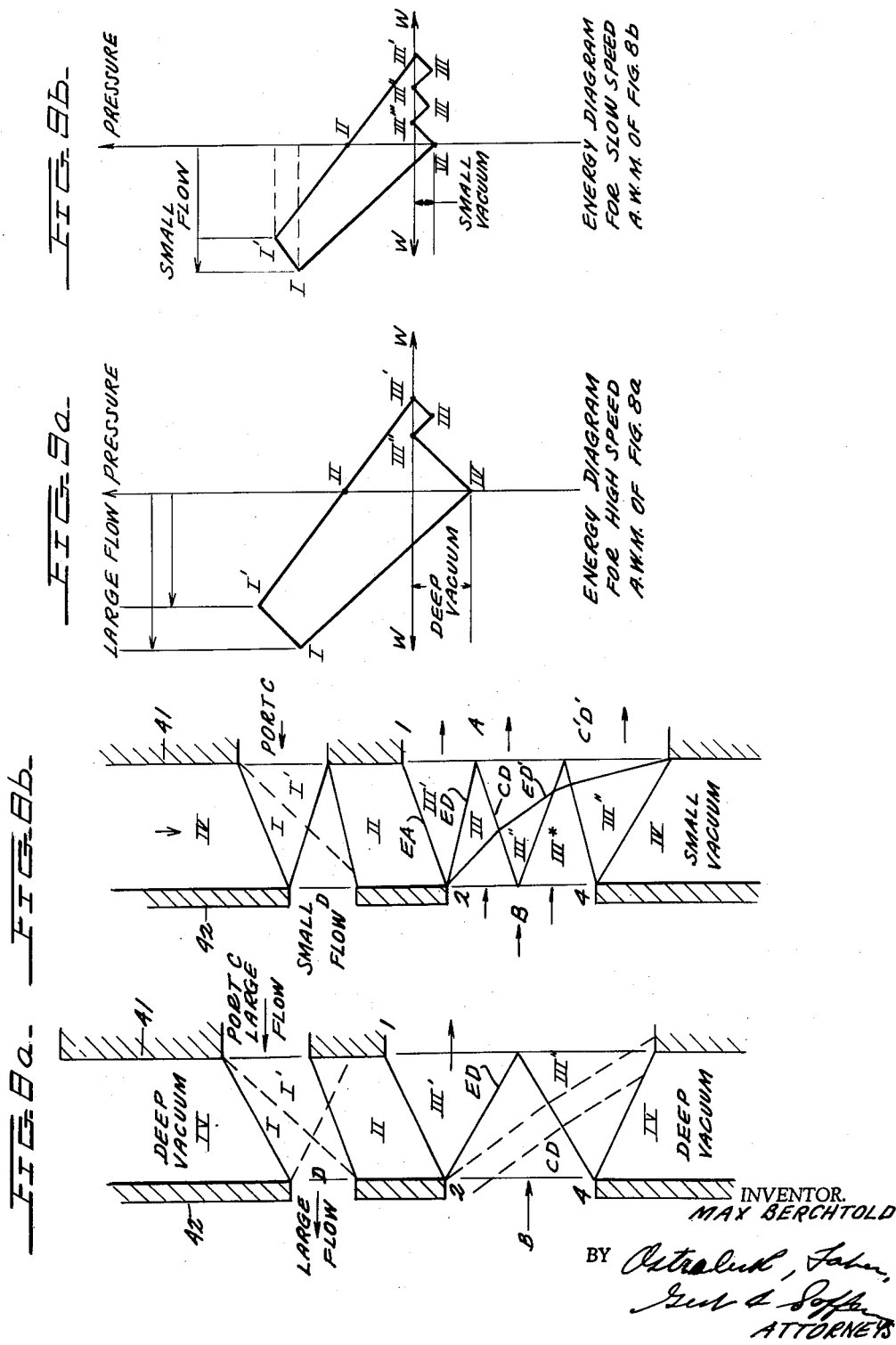

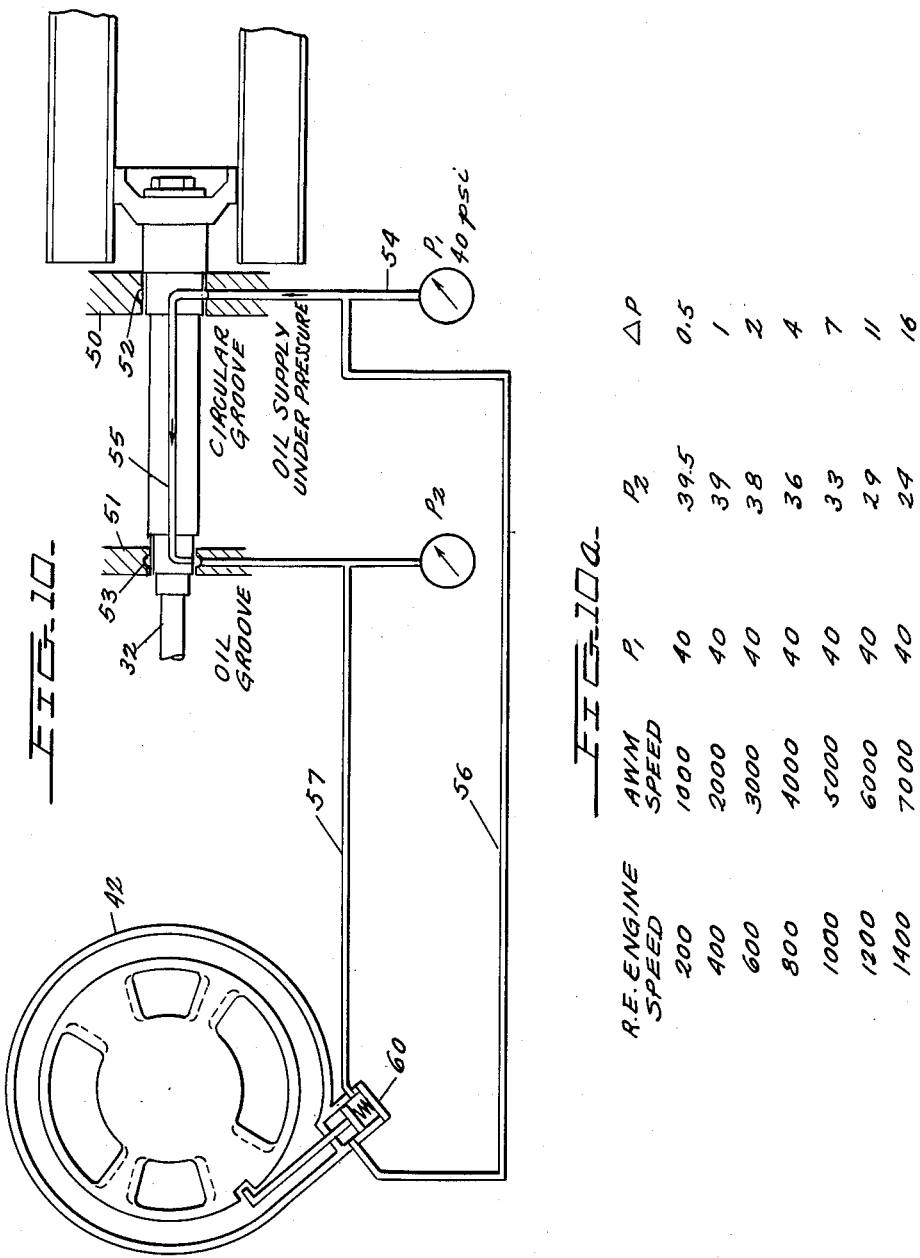

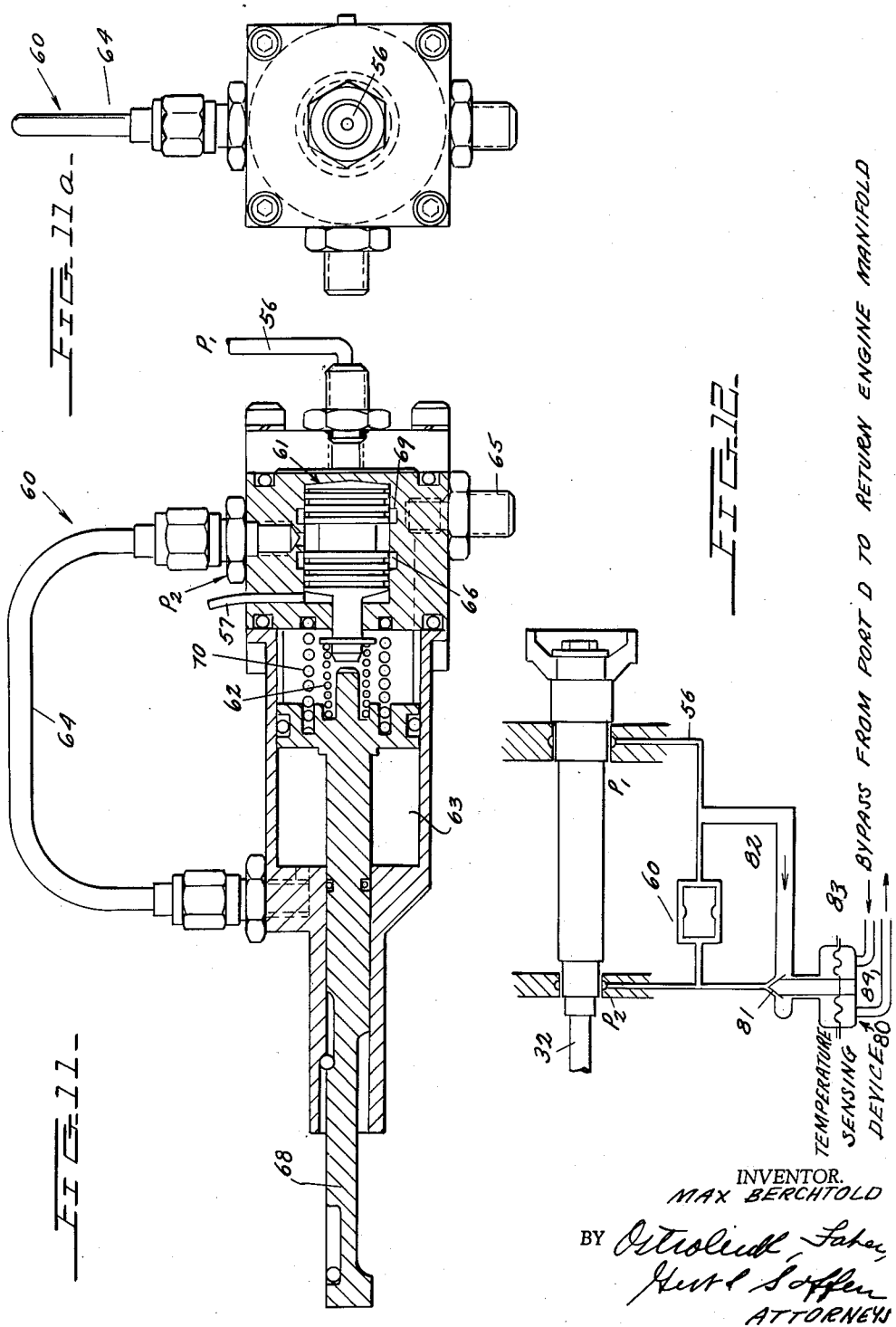

United States Patent Office 3,011,487
Patented Dec. 5, 1961

3,011,487
ADJUSTABLE STATOR PLATE FOR VARIABLE SPEED AERO-DYNAMIC WAVE MACHINE
Max Berchtold, Paoli, Pa., assignor to I-T-E Circuit Breaker Company, Philadelphia, Pa., a corporation of Pennsylvania
Filed June 17, 1958, Ser. No. 742,601
6 Claims. (Cl. 123—119)

My invention relates to aero-dynamic wave machines used as super-chargers for reciprocating engines, and more particularly is directed to a novel arrangement wherein the aero-dynamic wave machine driven from the reciprocating engine has a stator plate which is adjustable with the speed of the reciprocating engine.

The operation of an aero-dynamic wave machine utilized in my instant invention is disclosed and illustrated in copending applications Serial No. 454,774, filed September 8, 1954, entitled Wave Engine, by Max Berchtold now Patent No. 2,970,745, Serial No. 647,091, filed March 19, 1957, entitled Reverse Cycle Aerodynamic Wave Machine, by Ernst Neidermann, now Patent No. 2,959,344, and Serial No. 637,570, filed January 31, 1957, entitled Reverse Cycle Aerodynamic Wave Engine, by Max Berchtold, all assigned to the assignee of the instant invention. However, in these prior art devices in which there is a fixed stator and either a constant speed of the aero-dynamic wave machine or a fixed stator with a variable speed aero-dynamic wave machine driven from the reciprocating engine, there is a decreasing efficiency due to the changes in the mass flow requirements of the reciprocating engine, i.e. changing r.p.m. of the reciprocating engine.

In operation of an aero-dynamic wave machine, it is usually necessary to have a drive or control means to provide timing for the waves. If the aero-dynamic wave machine is used as a super-charger it is most advantageous to obtain the necessary power to drive the aero-dynamic wave machine from the reciprocating engine. This can be achieved by any number of means, such as a belt drive, hydraulic drive, electrical drive, etc. The most economical and simple of these is the standard V belt drive. However, since most reciprocating engines operate over a range of engine speed, the aero-dynamic wave machine speed deviates at certain operating speeds from optimum conditions and thus the efficiency is substantially decreased due to mis-timing of the waves.

A primary object of my invention is to utilize a simple constant step-up ratio drive such as a direct standard V belt drive and simultaneously overcome the above noted disadvantages associated therewith.

The instant invention provides an aero-dynamic wave machine which is for instance belt driven by the reciprocating engine which it is to supercharge and is provided with an adjustable stator plate which is varied with the speed of the reciprocating engine and aero-dynamic wave machine to thereby insure that the mass flow at the pick-up of the aero-dynamic wave machine always meets the requirements of the reciprocating engine. Thus, the aero-dynamic wave machine will always be operated near its maximum efficiency. That is, for large ranges of speed the air to fuel ratio of the reciprocating engine can remain constant by the use of the adjustable stator plate of my instant invention and hence the smoke limit of the reciproctaing engine is not exceeded and the system operates at maximum efficiency.

(*I*) *Mass flow output of aero-dynamic wave machine*

When the aero-dynamic wave machine has a fixed stator plate and is driven at constant speed, the mass flow required by the reciprocating engine decreases when the reciprocating engine speed decreases and, therefore, may result in a low efficiency of the aero-dynamic wave machine because:

(*Ia*) *Mass flow requirements of reciprocating engine*

In my copending application Serial No. 637,570 filed January 31, 1957, entitled, "Reverse Cycle Aero-Dynamic Wave Engine," by Max Berchtold, in FIGURE 7 there is seen a reflected wave CD as defined on page 19, line 13, to end of page, and on page 20, lines 1–18. This reflected wave results in more efficiency of the reciprocating engine but also results in a decrease in the efficiency of the aero-dynamic wave machine since the fluid in the rotor channels located between the high and low pressure stages is raised to a higher pressure, thereby decreasing the efficiency of the aero-dynamic wave machine since this surplus energy is lost or spilled out into the exhaust port A. It is noted that it is desirable to maintain some magnitude of reflected wave in order to insure that there will be a sufficient pressure in the rotor channels located between the high and low pressure stages to insure effective scavenging, but it is essential not to exceed the pressure requirements for effective scavenging since this will merely represent wasted energy.

In the event the aero-dynamic wave machine is designed for full scavenging so that its entire output is admitted by the reciprocating engine, then there will not be a reflected wave at the pick-up port which effectively means a lower pressure in the rotor channels at the time the exhaust port opens and as a result thereof there will be poor suction for scavenging resulting in an inefficient aero-dynamic wave machine. This condition can be corrected by merely making the aero-dynamic wave machine larger. This, however, means that the receiving wave becomes very strong at 6W engine speed, which means a high pressure in the rotor channel when the exhaust port opens. This results in inefficiency of the aero-dynamic wave machine at the new speed. The inefficiency is caused by the need for higher exhaust gas temperature from the engine. That is, the air manifold pressure will be substantially lower at low engine speed than it is at high engine speed if the exhaust gas temperature remains constant.

(*Ib*) *R.p.m. requirements of aero-dynamic wave machine used as a supercharger*

In copending application Serial No. 637,570, filed January 31, 1957, entitled, "Reverse Cycle Aero-Dynamic Wave Engine," by Max Berchtold, it is noted that within limits the r.p.m. of the aero-dynamic wave machine used as a supercharger is not critical. However, it is imperative for efficient operation that the expansion and compression waves be created and propagated in a predetermined order and sequence which for any given condition would vary with the r.p.m. of an aero-dynamic wave machine.

Although it is desirable to have the aero-dynamic wave machine driven at a constant speed independent of the reciprocating engine speed, in practice, the speed, and thus the mass flow requirements, of the reciprocating engine vary and hence a fixed drive aero-dynamic wave machine would not be efficient through the entire speed of the reciprocating engine. However, a belt drive from the reciprocating engine to the aero-dynamic wave machine, in the absence of a variable stator plate, is not desirable since the wave sequence of propagation and arrival would be upset as above noted.

(*II*) *Adjustable stator plate or present invention*

In my present invention I am able to take into account the conditions noted in *Ia* and *Ib* above in which I have the aero-dynamic wave machine driven from the reciprocating engine by a belt direct V belt drive and at the same time both maintain a variable mass flow to meet the requirements of the reciprocating engine and maintain high efficiency of the aero-dynamic wave machine.

This is achieved by means of a structural arrangement which permits proper wave timing required for variable aero-dynamic wave machine speeds by effectively changing the position of the ports with changes in wave machine speed.

My invention consists of an adjustable plate which may be mounted between the cold stator and the face of the rotor. Since the ports in the adjustable plate are smaller than the ports in the stator plate, it is possible to have a range of operation wherein the cross-section of the ports remain constant although their angular location with respect to the ports in the opposite stator are shifted. Thus, if the plate is adjusted as a function of the aero-dynamic wave machine's r.p.m., the timing of the waves can be correct for all speeds within the operating range of the reciprocating engine and aero-dynamic wave machine and still maintain both the proportional mass flow required as well as constant efficiency of the aero-dynamic wave machine. The control of the adjustable plate can be accomplished by any one of a number of means, as for example, mechanical, hydraulic, pneumatic, or electrical governor which will transmit a signal indicating either the r.p.m. of the reciprocating engine or the belt driven aero-dynamic wave machine to the adjustable plate setting it at a definite angular position dependent upon the speed of the device.

One structural example for changing the angular position of an adjustable plate consists of the following arrangement: an oil passage connecting the large and small bearing on the shaft of the aero-dynamic wave machine serves as a governor. The oil pressure established in this rotating radial passage is a function of both the shaft speed and shaft diameter. Since the shaft diameter at each bearing is different the oil pressure at each bearing is different. Thus, for a fixed shaft dimension the pressure differential will represent a function of the speed of the shaft and hence can be used to actuate the adjustable plate by means of a hydraulic piston. The oil pressures can be applied directly to the actuator piston or a pilot valve can be used to admit oil to the actuator until the predetermined angular position of the adjustable plate is reached. The adjustable plate can be slidably secured to the stator by means of a breech type lock.

Thus, with my invention, it is possible to always maintain proper timing of the waves even though the aero-dynamic wave machine has a belt drive from the reciprocating engine.

Accordingly, a primary object of my invention is to provide an aero-dynamic wave machine as a supercharger for a reciprocating engine wherein an adjustable plate is angularly positioned with respect to the speed of the aero-dynamic wave machine to insure both adequate mass to the reciprocating engine and high efficiency of the aero-dynamic wave machine.

An object of my invention is to provide an aero-dynamic wave machine having an adjustable plate whereby the pressure at the pick-up port is maintained constant for all speeds of the aero-dynamic wave machine.

Another object of my invention is to provide an adjustable plate for an aero-dynamic wave machine wherein the main waves are always properly timed irrespective of the speed of the aero-dynamic wave machine so as to maintain constant pressure at the pick-up port.

A still further object of my invention is to provide a novel adjustable plate for an aero-dynamic wave machine whereby the mass flow output of the machine can be modified to meet the requirements of the reciprocating engine which causes variations in speed of the aero-dynamic wave machine.

Still another object of my invention is to provide an adjustable plate for an aero-dynamic wave machine which not only maintains a constant pressure at the pick-up port, but simultaneously modifies the mass flow output to meet the requirements of the reciprocating engine.

Still another object is to provide an adjustable plate for an aero-dynamic wave machine which will permit angular distance between edges of a port to remain constant while changing the relative angular location of ports with respect to other ports.

Another object of my invention is to provide a novel arrangement whereby the aero-dynamic wave machine of my invention can be belt driven by a reciprocating engine which it is to supercharge and still overcome all of the disadvantages heretofore existing in variable speed machines.

A still further object of my invention is the provision of an adjustable plate for an aero-dynamic wave machine which eliminates both mis-timing and inefficiency due to either too strong or too weak reflected waves over the entire operating speed range of a reciprocating engine which is supercharged thereby.

There are many conditions such as starting, idling and low load conditions which require extra control. For example, in my copending patent application Serial No. 684,937, filed September 19, 1957, now Patent No. 2,853,987, entitled Diesel Engine Supercharged by the Aerodynamic Wave Machine by Max Berchtold and Ernst Niedermann and assigned to the assignee of the instant invention, this is achieved by a throttle valve which effectively cuts off the ports during these conditions. In my instant invention the problem arising due to starting, idling, and low load conditions is overcome by having the adjustable plate rotate to a position whereby the effective cross-sectional area of the pick-up port is substantially reduced.

Accordingly, another object of my invention is to provide an adjustable plate which not only serves to modify the position of leading and lagging edges of the ports to adjust timing during normal speed variations, but also can modify the cross-sectional area of the ports during starting, idling and low load conditions.

If a hydraulic governor is used to position the adjustable plate as a function of the aero-dynamic wave machine r.p.m. the control system can be adapted with means to defeat the speed control and substitute another control during starting, idling and low load conditions. That is, for instance a pressure differential or discharge temperate operated diaphragm is used to position the adjustable plate during these conditions. There might also be applications where the movable plate is manually operated and is only used during starting.

These and other objects of my invention will be apparent from the following description when taken in connection with the drawings in which:

FIGURE 1 is a schematic perspective view of an aero-dynamic wave machine having reverse cycle with two cycles per revolution. This figure illustrates the rotor, ports within the stators, and my novel adjustable plate.

FIGURE 2 is a cross-sectional view of the rotor and stator taken in the direction of the arrows 2—2 of FIGURE 4 and illustrates my novel adjustable plate.

FIGURE 2a is a view taken in the direction of the arrows 2a—2a of FIGURE 2 and illustrates a hot stator.

FIGURE 2b is a view taken in the direction of the arrows 2b—2b of FIGURE 2 and illustrates my novel adjustable plate in relation to the cold stator.

FIGURE 3 is another cross-sectional view of the rotor and stator similar to FIGURE 2 in which the left portion is taken in the direction of the arrows 3—3a of FIGURE 4 and the right portion of which is taken in the direction of the arrows 3—3b of FIGURE 4 and illustrates the position of my novel adjustable plate.

FIGURE 4 is an end view taken in the direction of the arrows 4—4 of FIGURE 3.

FIGURE 5 is a schematic developed view of the rotor and port showing the condition of the fluids in each section of the rotor having reverse cycle operation. This view illustrates the cycle of operation at design conditions and illustrates an ideal design cycle.

FIGURE 6 is a graphic illustration plotting aerodynamic wave machine air mass flow vs. reciprocating engine r.p.m. and illustrates the relationship for seven different conditions between the requirements of a reciprocating engine and that actually delivered by an aero-dynamic wave machine used as a supercharger.

FIGURE 6a is a chart showing the various conditions of operation for the series of curves of FIGURE 6.

FIGURE 7a is a schematic developed view of the rotor and ports showing the condition of the fluids in each section of the rotor with complete high pressure scavenging and a slight excess of low pressure scavenging.

FIGURE 7b is a view similar to FIGURE 7a and illustrates the condition within the rotor when the r.p.m. of the aero-dynamic wave machine has been reduced and no compensation has been made for proper timing as a result of a fixed stator.

FIGURE 7c is a view similar to FIGURE 7a for the same reduced speed as illustrated in FIGURE 7b but shows proper timing of the waves due to the variable stator plate of my instant invention in order to maintain constant pressure at the pick-up port.

FIGURE 8a is a schematic developed view of the rotor and ports showing condition of fluids for typical high speed cycle and illustrates complete wave and flow patterns. This figure illustrates the secondary waves created in the rotor.

FIGURE 8b is similar to FIGURE 8a but is an illustration for low speed cycle to show reduced mass flow and illustrate complete wave and flow pattern. This figure illustrates how the secondary wave reduces mass flow into and out of the aero-dynamic wave machine in order to meet mass flow requirements of the engine being supercharged.

FIGURE 9a is an energy diagram of FIGURE 8a and illustrates the high vacuum created for required mass flow.

FIGURE 9b is an energy diagram of FIGURE 8b and illustrates the reduced vacuum created to reduce mass flow to meet requirements.

FIGURE 10 is a cross-sectional view of the aero-dynamic wave machine rotor shaft and illustrates the hydraulic system by which the actuator of the adjustable plate is operated.

FIGURE 10a is a chart illustrating the various conditions for the hydraulic systems of FIGURE 10.

FIGURE 11 is a cross-sectional view of the actuator for the adjustable plate.

FIGURE 11a is an end view of FIGURE 11.

FIGURE 12 is a schematic view of the defeater circuit used for starting, idling, and transient conditions.

Referring first to FIGURES 1-4, the rotor 30 is driven for rapid rotation about its axis by means of a belt drive from the reciprocating engine to be supercharged by the machine placed over the pulley 31 of the rotor shaft 32. The manner in which the exhaust gases from a reciprocating engine are supplied to the aero-dynamic wave machine and the manner in which the compressed air out of the aero-dynamic wave machine is supplied to a reciprocating engine is illustrated and described in my copending application Serial No. 458,771 filed September 28, 1954, entitled Aero-Dynamic Wave Machine as a Supercharger for Reciprocating Engines, by Max Berchtold, now Patent No. 2,957,304. The rotor 30 has an outer shroud 33 and a plurality of cells 35. The adjustable plate 42, which is the main structural element of my invention, is positioned between the cold stator 40 and the rotor 30. The stator 40 and adjustable plate 42 are placed at one end of the rotor and the hot stator 41 is placed at the other end of the rotor in the closest possible proximity thereto consistent with both high speed rotation required in the rotor as well as variations due to expansion of the parts and still maintain the best possible fluid tight seal. The adjustable plate 42 is provided with a plurality of ports B', D', B', D' which correspond to opening B, D, B, D in stator 40 but have a smaller cross-section. The stator 41 on the right side of the rotor 30 is provided with a nozzle C for the input of a first fluid at elevated pressure and temperature and an exhaust port A for exhausting the first fluid at approximately ambient pressure. Stator 40—42 on the left side of rotor 30 is provided with a pick-up port D for the output of a second fluid at elevated pressure, which fluid is the compressed air supplied to the reciprocating engine, and an air intake port B for the intake of the second fluid at ambient pressure. Since rotor 30 is belt driven from the reciprocating engine it rotates with variable speed but as will hereinafter be more fully described my instant invention provides a variable plate 42 which coordinates with the stator 40 to produce and maintain a required timing for the waves and interfaces with respect to the various ports. As individual cells of the rotor move successively past opposite ports C and D and then A and B, the creation and propagation of the various waves as well as the pressure interchanges and interfaces which occur are demonstrated in a development view of FIGURE 5. A detailed analysis of the cycle of operation is set forth in copending application Serial No. 454,774, filed September 8, 1954, entitled Wave Engine by Max Berchtold.

Within the high pressure state I the leading edges 5 and 6 of the adjustable plate 42 and stator plate 41 respectively are physically related to each other and the trailing edges 7 and 8 are physically related to each other. The cycle of operation is totally independent of the length of time during which the fluid remains at state II and there is no relation between the pair of ports C, D of the high pressure cycle and the pair of ports A, B of the low pressure cycle.

FIGURE 5 illustrates an ideal condition in which there is complete high and low pressure scavenging of the machine. The action of the waves can also be studied in FIGURE 5 by cutting a narrow slot in a piece of paper to represent a typical cell 35 and sliding this slot transversely down FIGURE 5. In the illustration the first fluid, which represents the hot gas exhaust from the reciprocating engine, represented by the dotted area, and the second fluid, which is the compressed air output of the aero-dynamic wave machine into the reciprocating engine, is represented by the unmarked area. The movement of the fluid is indicated by the arrows.

The second fluid can be at ambient pressure and is always present at the intake scavenging port B, and the first fluid is always present at the nozzle C. The cells in the rotor are continuously moving past the ports and the closed spaces between the ports in the stator 41 and adjustable plate 42. Thus, for the purposes of description, the cycle of operation may start at any point.

At zero degree rotation the second gas is at rest at state IV in the rotor 30 at medium pressure. The period of time that the second fluid is at rest during state IV depends only on structural conditions and does not affect the cycle of operation. When the cell has rotated approximately 10° its right end reaches the leading edge 5, thereby permitting the high pressure gas in nozzle C to impinge upon the medium pressure second fluid within the rotor. Since the total pressure in the nozzle C is higher than the pressure of the second fluid in the cell, the first fluid will start to flow into the cell, thereby forcing the second fluid to move to the left. The first particle of second fluid which leaves the nozzle C impinges with a given velocity upon the second fluid within the cell, and by this action compresses the second fluid and puts it in motion. The first particles of the second fluid which are subjected to this impingement in turn push against adjacent particles and compress them, and also put these particles in motion. This mechanism creates a compression acceleration wave CA which travels faster than the second fluid now set in motion. The second fluid ahead of the wave CA is still stationary, and thus at its state IV. Behind or upstream of the wave CA both the compressed second fluid and the first fluid are in state I. Both fluids are at the same velocity and high pressure but divided by an interface identified as HPI.

When the cells have rotated approximately 25° their left end will reach the leading edge 6 on the adjustable plate 42 at pick-up port D and the relationship of the leading edge 5 to the leading edge 6 is such that all of the second fluid in the cell is compressed. Thus only compressed second fluid will be moved out into the pick-up port D. When the cells have rotated approximately 35° the right end is closed by the trailing edge 8 of the inlet nozzle C and no further particles of the first fluid enter the cell. Hence, the last particles of the second fluid in the channels will expand down to a given medium pressure and thereafter the next adjacent medium particles, which are no longer being pushed through the cells, will expand, and so on. This is the creation of an expansion deceleration wave ED which travels downstream through the cell and effectively decreases both velocity and pressure. The aero-dynamic wave machine is designed so that as soon as the expansion deceleration wave ED reaches the left end of the cell the cells will have rotated 45° to thereby close off the left end of the cell by the trailing edge 7 of the adjustable plate 42 at the pick-up port D so that no first fluid at medium pressure will enter the pick-up port D. It should be noted that if an aero-dynamic wave machine is designed for a specific pressure ratio such as illustrated in FIGURE 5 the leading edge 5 of the nozzle C is physically positioned with respect to the trailing edge 7 of the pick-up port D so that the high pressure interface HPI will arrive at the left end of the cell when the cell is rotated 45° and thereby closed off by the trailing edge 7 of the pick-up port D and thereby prevent any first fluid, even though at high pressure, from entering the pick-up port D.

Between approximately 45° and 60° rotation, as illustrated in FIGURE 5, i.e. after the cell has passed the pick-up port D and nozzle C, but has not yet reached either the intake port B or the exhaust port A, the cell is closed at both ends by the adjustable plate 42 and stator 41 and the first fluid is stationary in the cell at medium pressure. The length of time that the first gas remains at this state II does not affect the cycle of operation.

When the cell has rotated approximately 60°, as seen in the illustration of FIGURE 5, the right end of the cell is opened to the leading edge 1 of the exhaust port A, which port is at an ambient pressure lower than the pressure in the cell. Thus, an expansion acceleration wave EA is created at the leading edge 1 and is propagated upstream through the cell.

The pressure of the first fluid ahead of the wave EA is at state II, whereas the pressure behind the wave EA is at the ambient pressure existing in the exhaust port A, so that the exhaust or scavenging velocity will depend on the pressure drop through the wave EA.

The aero-dynamic wave machine is designed so that as the expansion acceleration wave reaches the left hand end of the cell, the cell will be opened by the leading edge 2 of the intake port B, and as illustrated in FIGURE 5, at approximately 75°. At this time the first fluid in the cell is exposed at its left end to the second fluid at the intake port B and the first fluid starts flowing into the cell with the second fluid replacing the first fluid, i.e. scavenging out the first fluid. This condition continues to exist until the cell has rotated approximately 125°, at which time the left end of the cell is closed off by the trailing edge 4 of the adjustable plate 42 at the intake port B. At this time an expansion deceleration wave ED is created at the trailing edge 4, which wave travels downstream, thereby reducing the pressure of the second fluid to a pressure below ambient at state IV.

The machine is designed so that the right end of the cell is closed off by the trailing edge 3 of the port A when the expansion deceleration wave ED reaches the right end. At this time the cell contains only the second fluid at a vacuum and is stationary i.e. at state IV.

When the cell has rotated 180° the complete reverse cycle operation noted above will repeat itself as illustrated in FIGURE 5 and the same cycle of operation can be repeated for the remaining ports during the second 180° rotation.

In the description of FIGURE 5, it will be noted that the aero-dynamic wave machine is operated under ideal conditions in which there is not only proper timing of the various waves and interfaces, but also the device operates at maximum efficiency to deliver the required mass flow from the pick-up port D to a reciprocating engine which is supercharged by the aero-dynamic wave machine. In the description thus far, it has been assumed that the aero-dynamic wave machine is operated at a fixed r.p.m. which r.p.m. enables the device to operate under near optimum conditions.

As described in the introduction of the instant application, it is desirable to have the aero-dynamic wave machine driven by the reciprocating engine which it is to supercharge. Thus, for example, some shaft energy from the reciprocating engine can be supplied to the aero-dynamic wave machine by utilizing a belt drive such as shown by pulley 31. However, as will hereinafter be more fully explained in connection with FIGURE 6, the timing requirements and efficiency of the machine will be upset with variable r.p.m. of the reciprocating engine and thus variable r.p.m. of the aero-dynamic wave machine unless the adjustable plate 42 of my invention is used to reestablish timing and enable the aero-dynamic wave machine to satisfy the new mass flow requirements of the reciprocating engine. The chart of FIGURE 6a illustrates the various conditions of the arrangement illustrated in FIGURE 6.

However, as seen in the conditions of curves 2, 3 and 4 of FIGURE 6 and chart of FIGURE 6a, a constant speed aero-dynamic wave machine does not meet either maximum efficiency or the required mass flow of the reciprocating engine when there are variations in speed of the reciprocating engine. In fact, this situation is further aggravated by a variable speed aero-dynamic wave machine as seen for curves 5, 6, 7 wherein the deviation from required mass flow of the reciprocating engine for variations in speed are even greater than in a constant speed aero-dynamic wave machine. However, I have found that by using a variable plate 42, I am able to reestablish timing of the main waves to keep maximum efficiency so that there will be an approximately constant pressure output at the pickup port as will be explained in connection with FIGURES 7b and 7c. Also, with my variable plate 42, I am able to have the aero-dynamic wave machine always meet the mass flow requirements of the reciprocating engine, as will be explained in connection with FIGURES 8a, 8b, 9a and 9b, so that the air flow delivered by the aero-dynamic wave machine mass flow will follow curve 1 as illustrated in FIGURE 6.

In the illustration of FIGURE 7a, which is drawn in alignment to be in the same angular relationship as FIGURES 7b and 7c, I have illustrated an ideal cycle for an aero-dynamic wave machine rotating at 7,000 r.p.m. In this illustration, high pressure pick-up port D and low pressure intake port B respectively of the adjustable plate 42 and stator 40 are angularly positioned with respect to the high pressure intake port C and the low pressure exhaust port A of the stator 41 to provide optimum efficiency of the nature described in connection with FIGURE 5. Thus, all of the main waves such as the compression acceleration wave CA and expansion deceleration wave ED originate and terminate at leading and trailing edges of the ports so that there is maximum pressure at the high pressure pick-up port D. Also, in FIGURE 7a there is a relatively high mass flow from the pick-up port D and in the illustration the mass flow will meet the requirements of a reciprocating engine which may be supercharged by the aero-dynamic wave machine.

If the rotor speed of the aero-dynamic wave machine is slowed down, for example to 3,500 r.p.m., without any corresponding readjustment of the angular position of the ports on the left side of the rotor with respect to the ports on the right side of the rotor, then there will be complete mistiming of the main waves in the machine, such as illustrated in FIGURE 7b. Thus, for example, the compression acceleration wave CA created at the leading edge 5 of the high pressure intake port C will traverse the rotor and terminate on the plate 42 ahead of the leading edge 6 of the high pressure pick-up port D. Thus, this will create a main reflected wave CD which will again reflect when it reaches the high pressure intake port C.

Furthermore, there will be created an expansion acceleration wave at the leading edge 6 of the high pressure pick-up port D. The creation of these undesirable main waves due to the mistiming will result in a back flow at the pick-up port D, thereby not only substantially reducing the pressure at the pick-up port D, but also dropping the mass flow to a value substantially below the requirements of the reciprocating engine to be supercharged by the aero-dynamic wave machine. With my novel invention I am able to correct this condition by angularly positioning the adjustable plate 42 in accordance with the speed of the rotor 30. Thus, in the illustration of FIGURE 7c, I have shown how the adjustable plate 42 is angularly rotated 10° backwards so that the angular displacement between the high pressure pick-up port D and the high pressure intake port C is reduced so that the leading edge 6 of the pick-up port D will be angularly positioned so that the compression acceleration wave created at the leading edge 5 of the high pressure intake port C will terminate thereon.

Thus, in both the high and low pressure stages there will be a complete reestablishment of proper timing of the main waves for the aero-dynamic wave machine as illustrated in FIGURE 7c due to the angular rotation of the adjustable plate 42. Hence, the pressure at the pick-up port D will remain constant and by the same value and magnitude as the pressure existing at the pick-up port D in the illustration of FIGURE 7a even though the speed of the rotor has ben reduced to one-half the initial value. Thus, with my novel adjustable plate 42 I am able to maintain optimum efficiency by properly reestablishing timing of the main waves so that a constant pressure will always exist at the pick-up port D irrespective of the r.p.m. of the rotor.

As has heretofore been explained in connection with FIGURES 7a, 7b, and 7c, a belt driven aero-dynamic wave machine used as a supercharger for a reciprocating engine will vary its speed with the speed of the reciprocating engine, but due to the adjustable plate 42 can readjust the timing of the main waves. Thus, for example, as seen by the comparison of FIGURES 7a, 7b and 7c, the main waves are improperly timed in the illustration of 7b when the aero-dynamic wave machine is slowed down and adjustable plate 42 is not readjusted.

However, as seen in FIGURE 7c, when the adjustable plate 42 is readjusted for the new speed, the main waves are now properly timed so that the proper magnitude of pressure exists in the pick-up port D.

In the absence of this proper timing, such as seen in FIGURE 7b, there will be not only a substantial reduction in pressure at the pick-up port D, but also there will be a reduction in the mass flow, which reduction may be below the reduced mass flow requirements of the reciprocating engine. That is, there is a back flow at the pick-up port D which so substantially reduces the mass flow output of the pick-up port D as to possibly cause smoking or stalling of the reciprocating engine supercharged thereby. However, essentially, the description thus far has illustrated that by the utilization of my novel adjustable plate 42, I am able to maintain a constant pressure at the pick-up port D over a wide speed range of the reciprocating engine.

As is well known in the art, the mass flow requirements to supercharge a reciprocating engine are a function of the reciprocating engine's speed such as seen in FIGURE 6, curve 1. With my novel adjustable plate 42, I am not only able to maintain a given pressure at the pick-up port D, but as will hereinafter be more fully described in connection with FIGURES 8a, 8b, 9a and 9b, will be able to fulfill the variable mass flow requirements of the reciprocating engine.

Thus, as the reciprocating engine slows down, thus slowing down the aero-dynamic wave machine, the corresponding reduction in the mass flow requirements of the reciprocating engine will be automatically met by the aero-dynamic wave machine since there will be a reduced mass flow from the pick-up port D as a result of my novel adjustable plate 42 without the loss of efficiency.

In copending application Serial No. 647,091 filed March 19, 1957, entitled, "Reverse Cycle Aero-dynamic Wave Machine," by Ernst Neidermann, an arrangement of ports for an aero-dynamic wave machine has been described and claimed whereby the trailing edge of the input scavenging port is positioned ahead of the trailing edge of the exhaust scavenging port to thereby create an expansion wave instead of a compression wave as existed in the prior art. With this arrangement it has been found that due to the decrease in pressure in the portion of the rotor between the low pressure stage and the high pressure stage it is possible to obtain a substantial increase in the velocity of the fluid which will flow through the pick-up port in the high pressure stage as well as through the exhaust scavenging port in the low pressure stage. Thus, I find that when my novel adjustable plate is used in conjunction with an arrangement of ports as above noted, new and unobvious results are obtained, since this combination will permit an automatic adjustment of mass flow while simultaneously maintaining proper wave timing to maintain constant pressure at constant efficiency. This concept will be more readily understood in connection with FIGURES 8a, 8b, 9a and 9b.

As illustrated in the arrangement of FIGURE 8a wherein the sequence of operation and creation of waves is substantially as set forth and described in connection with FIGURE 7a, I have illustrated the secondary waves created in the low pressure state in FIGURES 8a and 8b. Thus, for example, in the low pressure stage, there is created secondary waves identified as ED and CD. That is, at the leading edge 2 of the intake port B, there is created an expansion deceleration wave ED which specifically is reflected as a compression deceleration wave CD.

The cycle of operation illustrated in FIGURE 8a is for an aero-dynamic wave machine designed for specific optimum conditions and in this illustration the optimum speed is 7,000 r.p.m. These optimum dimensional r.p.m. conditions result in the compression deceleration wave arriving at the left end of the channel simultaneously with the arrival of the left end of the channel arriving at the trailing edge of the intake scavenging port B.

Thus, the compression deceleration wave will not influence the magnitude of pressure within the channel which affects the suction of scavenging air into the rotor from the intake port B. Hence, the velocity remains constant over the full width of the intake port B. The conditions within the rotor with regard to flow velocity plotted against pressure in the various states of the fluid are illustrated in FIGURE 9a where it is seen that fluid at state III is constant and at a substantially high velocity, which velocity permits the proper scavenging of the rotor channel in order to have the amount of air available at the pick-up port required by the reciprocating engine.

If the reciprocating engine supercharged by the aero-dynamic wave machine is slowed down, the speed of the supercharger will be reduced proportionally due to the direct drive between the reciprocating engine and the aero-dynamic wave machine. In the absence of an adjustable plate 42, the main waves will be mistimed as illustrated and described in connection with FIGURE 7b, thereby resulting in a substantial loss in efficiency. The pressure at the pick-up port D will be considerably lower.

However, if the stator plate 42 is now automatically adjusted, as a result of the reduced speed, the timing of the waves will automatically be readjusted as illustrated in FIGURES 7c and 8b. As illustrated in FIGURE 8b, however, there is not only a readjustment of the timing of the waves to maintain a fixed pressure at the pick-up port D, but there will also be a readjustment of the intake mass flow and a subsequent readjustment of the mass flow at the pick-up port D and at the nozzle port C.

The expansion acceleration wave EA created at the exhaust opening edge 1 is reflected at the opening edge 2 of the intake port B as an expansion deceleration ED wave. This wave when reflected as a compression deceleration wave CD, will not terminate at the trailing edge of the intake port B, and hence, again will create a second wave E'D' which in turn when reflected will create a second wave C'D'.

The conditions of the fluid created by this series of secondary waves is illustrated in FIGURE 9b where it is seen that the various states of the fluid within the rotor at the low pressure stage have a substantial reduction in their velocity. This results in a substantial reduction of the air flow entering the rotor at the intake port B. In like manner, these secondary waves also reduce the velocity in exhaust scavenging port A. Thus, the amount of fluid accepted by the supercharger as a result of the creation of the secondary waves is reduced as seen in the energy diagram of FIGURE 9b when compared to the energy diagram of FIGURE 9a.

The air flow leaving the rotor through the pick-up port D as well as the hot gas flow entering the rotor through the nozzle port C also increases, as can be seen from a comparison of FIGURES 8a and 8b, and FIGURES 9a and 9b. In case of the high wave machine speed (FIGURES 8a and 9a) the intake flow velocity is higher as discussed above. Therefore, the pressure in field IV falls considerably below ambient pressure at the time the intake port B closes. This low static pressure in the rotor channel causes a larger inflow velocity of the exhaust gas port C as can be seen from a comparison of FIGURES 9a and 9b. This results in a higher air flow velocity in the pick-up which means that the pick-up flow also increases.

Since as heretofore noted, the adjustable plate 42 maintains an essentially constant pressure at the pick-up port D, the reduced velocity resulting from a reduced r.p.m. of the reciprocating engine will thus automatically reduce the mass flows of the aero-dynamic wave machine to meet the reduced requirements of the reciprocating engine. The typical energy diagrams of FIGURES 9a and 9b show the effect of the speed of the aero-dynamic wave machine on the flow velocity in all ports of the machine. A speed reduction less than the extreme cases shown in FIGURE 8 and FIGURE 9 results in a lesser mass flow reduction.

In the description thus far it has been seen that the adjustable plate 42, in order to maintain optimum efficiency and modify the mass flow output of the wave machine, must be responsive to the r.p.m. of the rotor. To this end, any desirable means can be provided to achieve this result. However, in FIGURE 10 I have illustrated an arrangement whereby the shaft 32 of the rotor is provided with a bearing 50 and 51 in which the bearing 50 has a circular groove 52 which is at a larger radius than the circular groove 53 of the bearing 51. An oil supply line 54, under pressure of, for example 40 p.s.i., is provided to the circular groove 52 of the bearing 51. An oil channel 55 within the shaft 32 connects the circular groove 52 to the circular groove 53.

The bearing pressure in the groove 52 is equal to the supply pressure, while the pressure in the bearing groove 53 changes with the r.p.m. of the shaft on account of the difference of the centrifugal force acting on the rotating oil columns in the two bearings of different diameter. Thus, as seen in the diagram of FIGURE 10a, with variations in reciprocating engine speed or aero-dynamic wave machine speed, there will be a differential in pressure between $P_1$ at oil groove 52 and $P_2$ at oil groove 53 and this differential pressure $\Delta P$ will indicate the shaft r.p.m. As previously noted, the adjustable plate 42 is driven by actuator 60. By properly connecting the oil lines 56 and 57 to the actuator 60 it will position the stator plate as a function of the r.p.m. of the rotor of the aero-dynamic wave machine.

Thus, for example, as seen in FIGURE 10, as the magnitude of $\Delta P$ increases, the actuator will be moved to the right due to the fact that the pressure $P_1$ will be more than the combined force of the spring and pressure $P_2$. An embodiment for the actuator is illustrated in FIGURE 11 wherein the pressure $P_1$ transmitted through by the tube 56 is acting on the right side of the pilot piston 61 and the pressure $P_2$ transmitted through the tube 57 is acting on the left side of the pilot piston 61. When the rotor speed increases, the force of the spring 62 plus the pressure of $P_2$ decreases below the force $P_1$, the piston 61 will move to the left due to the force unbalance. Thus the piston 61 will no longer block the path between the tube 64 and the groove 66. The tube 57 is connected to the opening 66. Hence, oil under pressure will be permitted to enter from tube 57 through the opening 66 and pass through the tube 64 into the actuator cylinder 63. This will cause the actuator piston 68 to move to the right. The movement of the piston 66 will increase the force of the spring 62 and, therefore, move the piston 61 back to its neutral position, thereby closing off the oil supply to tube 64 through opening 66.

On the other hand, if the differential pressure decreases, resulting from a reduction in engine speed, the pilot piston 61 will be moved to the right, thereby opening up the drain 65 to the tube 64 through the openings 69 so that fluid in the actuator cylinder 63 can be released through tube 64 into the drain. Hence, the actuator 68, under the pressure of spring 70, will move to the left. This will also release pressure on spring 62 and cause the pilot piston 61 to again seek its neutral position and block off the drain 69.

Thus, with the actuator of FIGURE 11 operating the adjustable plate 42 in the manner illustrated in FIGURE 2b and controlled in the manner illustrated in FIGURE 10, it is possible to have the adjustable plate 42 angularly positioned as a function of the r.p.m. of the rotor.

In the description thus far, it has been assumed that the aero-dynamic wave machine is within the range of its operating speed. That is, for instance somewhere between 30% to 100% of engine r.p.m. and during this range of operation the adjustable plate 42 will be angularly varied with respect to its stator plate 40 so that the openings in the adjustable plate will be the sole factor to determine the leading and lagging edges of both the low pressure intake port and the high pressure pick-up port. That is, since the ports of the adjustable plate are smaller than the ports in the stator plate 40, the adjustable plate will only be moved within the limitations defined by the openings in the stator plate 40. However, under some conditions, as for example, starting, low load, and idling, it may be desirable to provide additional means to control the ports of the aero-dynamic wave machine.

One such additional means is set forth in my copending application Serial No. 684,937, filed September 19, 1957, entitled, "Diesel Engine Supercharged by the Aero-Dynamic Wave Machine," by Max Berchtold and Ernst Niedermann, wherein there is illustrated a butterfly valve to effectively close off the ports during these abnormal conditions. It will be noted that this same result can also not only be achieved by means of a throttle valve, but can also be achieved by means of a defeater for the differential pressure system described in connection with FIGURES 10 and 11. Thus, for example, as seen in FIGURE 12, there is provided a temperature sensing device 80 which measures the air temperature of the air leaving the rotor 30 at the pick-up port D. The air taken from the pick-up port D, through line 83 is returned to the engine intake manifold through the line 84. The temperature sensing element 80 controls the needle valve 81 and during normal load operations the needle valve 81 is closed. However, during starting and idling conditions the pick-up discharge temperature at port D will exceed the air temperature at normal operating conditions. Thus the temperature sensing element 80 will open the needle valve 81. Thus the valve controlled oil by-pass line 82 is opened and thus will by-pass the activator 60. Hence, this system will defeat the r.p.m. control signals to the activator 60 and hence the adjustable plate 42 will close off the pick-up port D until the temperature therein drops to normal value.

Thus, I have provided a novel adjustable plate whereby the wave timing can be readjusted for various r.p.m. of the rotor to maintain constant pressure at the pick-up port and also modify mass flow to meet the requirements of a reciprocating engine and still provide adequate means for both starting, low load, and transient conditions.

Thus, my invention is particularly adaptable to an aero-dynamic wave machine driven by and supercharging a reciprocating engine wherein the reciprocating engine has a wide variation in speed and in which it is desirable to maintain a constant torque for the engine.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. An aero-dynamic wave machine being comprised of a rotor, a first stator plate and an adjustable plate, said first stator plate being operatively positioned on one side of said rotor and said adjustable plate being operatively positioned on the opposite side of said rotor, said first stator plate having a low pressure exhaust and a high pressure intake, said adjustable plate having a low pressure intake port and a high pressure pick-up port, a reciprocating engine, said aero-dynamic wave machine adapted to supercharge said reciprocating engine whereby the high pressure pick-up port is connected to an intake of said reciprocating engine and an exhaust of said reciprocating engine is supplied to the high pressure intake port, said rotor being rotatably mounted on a shaft and operatively connected to be rotated at a speed which is a direct function of the speed of said reciprocating engine, a first means to automatically angularly position said adjustable plate as a function of the speed of said rotor, said first means comprising a hydraulic system having an actuator, a first and second circular groove, and a source of constant pressure fluid, said first and second circular groove being in a bearing concentric with the shaft of said rotor and being constructed with said first circular groove having a larger internal radius than said second circular groove, said first and second circular groove being connected to each other by a channel extending through said shaft; said actuator having a first and second section separated by a piston, said source of constant pressure fluid being connected to said first circular groove and said first section of said actuator; said second circular groove being connected to said second section of said actuator, said actuator being constructed and operatively positioned to automatically angularly position said adjustable plate as a function of the differential in pressure between said first and second circular groove; said adjustable plate being rotatably positioned by said actuator to maintain a fixed pressure at said high pressure pick-up port for all speeds of said rotor and to modify the mass flow from said high pressure pick-up port to meet the requirements of the reciprocating engine.

2. An aero-dynamic wave machine being comprised of a rotor, a first stator plate and an adjustable plate, said first stator plate being operatively positioned on one side of said rotor and said adjustable plate being operatively positioned on the opposite side of said rotor, said first stator plate having a low pressure exhaust and a high pressure intake, said adjustable plate having a low pressure intake port and a high pressure pick-up port, said aero-dynamic wave machine adapted to supercharge a reciprocating engine whereby the high pressure pick-up port is connected to an intake of the reciprocating engine and an exhaust of the reciprocating engine is supplied to the high pressure intake port, said rotor being rotatably mounted on a shaft and operatively connected to be rotated at a speed which is a direct function of the speed of said reciprocating engine, a first means to automatically angularly position said adjustable plate as a function of the speed of said rotor, said first means comprising a hydraulic system having an actuator, a first and second circular groove, and a source of constant pressure fluid, said first and second circular groove being in a bearing concentric with the shaft of said rotor and being constructed with said first circular groove having a larger internal radius than said second circular groove, said first and second circular groove being connected to each other by a channel extending through said shaft; said actuator having a first and second section separated by a piston, said source of constant pressure fluid being connected to said first circular groove and said first section of said actuator; said second circular groove being connected to said second section of said actuator, said actuator being constructed and operatively positioned to automatically angularly position said adjustable plate as a function of the differential in pressure between said first and second circular groove; a second means to defeat said first means for angularly positioning said adjustable plate as a function of starting, idling, and low load conditions of the reciprocating engine, said second means being located within the hydraulic system of said first means.

3. An aero-dynamic wave machine being comprised of a rotor, a first stator plate and an adjustable plate, said first stator plate being operatively positioned on one side of said rotor and said adjustable plate being operatively positioned on the opposite side of said rotor, said first stator plate having a low pressure exhaust and a high pressure intake, said adjustable plate having a low pressure intake port and a high pressure pick-up port, said aero-dynamic wave machine adapted to supercharge a reciprocating engine whereby the high pressure pickup port is connected to an intake of the reciprocating engine and an exhaust of the reciprocating engine is supplied to the high pressure intake port, said rotor being rotatably mounted on a shaft and operatively connected to be rotated at a speed which is a direct function of the speed of said reciprocating engine, a first means to angularly position said adjustable plate as a function of the speed of said rotor, said first means comprising a hydraulic system having an actuator, a first and second circular groove, and a source of constant pressure fluid, said first and second circular groove being in a bearing concentric with the shaft of said rotor and being constructed with said first circular groove having a larger internal radius than said second circular groove, said first and second circular groove being connected to each other by a channel extending through said shaft; said actuator having a first and second section separated by a piston, said source of constant pressure fluid being connected to said first circular groove and said first section of said actuator; said second circular groove being connected to said second section of said actuator, said actuator being constructed and operatively positioned to automatically angularly position said adjustable plate as a function of the differential in pressure between said first and second circular groove; a second means operatively constructed and positioned to defeat said first means for angularly positioning said adjustable plate as a function of starting, idling, and low load conditions of the reciprocating engine, said second means being located within the hydraulic system of said first means, said second means being operative to permit said adjustable plate to substantially block the passage to and from the low pressure intake port and high pressure pickup port of said machine.

4. An aero-dynamic wave machine being comprised of a rotor, a first stator plate and an adjustable plate, said first stator plate being operatively positioned on one side of said rotor and said adjustable plate being operatively positioned on the opposite side of said rotor, said rotor being rotatably mounted on a shaft and operatively connected to be rotated at a variable speed; a first means to automatically angularly position said adjustable plate as a function of the variable speed of said rotor; said first means comprising a hydraulic system to operate an actuator for said adjustable plate, said actuator having a first and second section separated by a piston, a first and second bearing groove in the shaft bearing, said first bearing groove having an internal radius greater than said second bearing groove, a source of constant pressure fluid supply to said first bearing groove and to said first section of said actuator, said first and second bearing groove being connected to each other by a channel extending through said shaft of said rotor, said second bearing groove being connected to said second section of said actuator, said piston of said actuator being movable and operatively connected to automatically angularly position said adjustable plate as a function of the difference in pressure between said first and second bearing groove.

5. An aero-dynamic wave machine being comprised of a rotor, a first stator plate and an adjustable plate, said first stator plate being operatively positioned on one side of said rotor and said adjustable plate being operatively positioned on the opposite side of said rotor, said rotor being rotatably mounted on a shaft and operatively connected to be rotated at a variable speed; a first means to automatically angularly position said adjustable plate as a function of the speed of said rotor; said first means comprising a hydraulic system to operate an actuator for said adjustable plate, said actuator having a first and second section separated by a piston, a first and second bearing groove in the shaft bearing, said first bearing groove having an internal radius greater than said second bearing groove, a source of constant pressure fluid supply to said first bearing groove and to said first section of said actuator, said first and second bearing groove being connected to each other by a channel extending through said shaft of said rotor, said second bearing groove being connected to said second section of said actuator, said piston of said actuator being movable and operatively connected to automatically angularly position said adjustable plate as a function of the difference in pressure between said first and second bearing groove, a second means being located within the hydraulic system of said first means to defeat said first means during starting, idling and low load conditions of said wave machine.

6. An aero-dynamic wave machine being comprised of a rotor, a first stator plate and an adjustable plate, said first stator plate being operatively positioned on one side of said rotor and said adjustable plate being operatively positioned on the opposite side of said rotor, said rotor being rotatably mounted on a shaft and operatively connected to be rotated at a variable speed; a first means to automatically angularly position said adjustable plate as a function of the speed of said rotor; said first means comprising a hydraulic system to operate an actuator for said adjustable plate, said actuator having a first and second section separated by a piston, a first and second bearing groove on a shaft of said rotor, said first bearing groove having an internal radius greater than said second bearing groove, a source of constant pressure fluid supply to said first bearing groove and to said first section of said actuator, said first and second bearing groove being connected to each other by a channel extending through said shaft of said rotor, said second bearing groove being connected to said second section of said actuator, said piston of said actuator being movable and operatively connected to automatically angularly position said adjustable plate as a function of the difference in pressure between said first and second bearing groove, a second means to defeat said first means during starting, idling and low load conditions of said wave machine, said second means including a fluid bypass connecting said first and second section of said actuator, a valve to open and close said fluid bypass, a temperature sensing means to control the operation of said valve.

References Cited in the file of this patent
UNITED STATES PATENTS
2,836,346    Jendrassik _____ May 27, 1958